(12) United States Patent
Zielke et al.

(10) Patent No.: US 10,181,597 B2
(45) Date of Patent: Jan. 15, 2019

(54) ELECTROCHEMICAL ENERGY STORE

(71) Applicant: Robert Bosch GmbH, Stuttgart (DE)

(72) Inventors: Christian Zielke, Eningen Unter Achalm (DE); Vikram Anil Godbole, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 445 days.

(21) Appl. No.: 14/603,720

(22) Filed: Jan. 23, 2015

(65) Prior Publication Data

US 2015/0207137 A1    Jul. 23, 2015

(30) Foreign Application Priority Data

Jan. 23, 2014  (DE) .................. 10 2014 201 157

(51) Int. Cl.
*H01M 2/36* (2006.01)
*H01M 2/02* (2006.01)

(52) U.S. Cl.
CPC ......... *H01M 2/365* (2013.01); *H01M 2/0287* (2013.01); *H01M 2220/20* (2013.01); *Y10T 29/4911* (2015.01); *Y10T 29/49108* (2015.01)

(58) Field of Classification Search
CPC .... H01M 2/0287; H01M 2/02–2/0295; H01M 2/36–2/362; H01M 2/365–2/367
See application file for complete search history.

(56) References Cited

U.S. PATENT DOCUMENTS

| 3,823,040 A | 7/1974 | Jagid |
| 2003/0228515 A1 | 12/2003 | Woehrle et al. |
| 2004/0166406 A1* | 8/2004 | Higuchi ................. H01M 2/021 429/171 |
| 2007/0154794 A1* | 7/2007 | Kim ....................... H01M 2/021 429/162 |
| 2010/0310930 A1* | 12/2010 | Park ....................... B32B 15/08 429/185 |

FOREIGN PATENT DOCUMENTS

| JP | 2006260975 A | * 9/2006 |
| KR | 20090010410 | 1/2009 |
| KR | 20120060315 | 6/2012 |

OTHER PUBLICATIONS

Machine Translation of JP2006260975 originally published to Okushita on Sep. 28, 2006.*

* cited by examiner

*Primary Examiner* — Jonathan G Leong
(74) *Attorney, Agent, or Firm* — Michael Best & Friedrich LLP

(57) ABSTRACT

An electrochemical energy store (10), comprising a housing (12) for accommodating at least one cell unit (24), wherein the housing (12) forms a receptacle space for the arrangement of the cell unit (24), wherein a surface (17) of the housing (12) facing the receptacle space is completely covered by an electrically insulating material (27), wherein the housing (12) also comprises an opening (20) for filling a fluid electrolyte into the receptacle space, and wherein the opening (20) is covered by two overlapping end regions (26, 28) of the electrically insulating material (27). An energy store (10) according to the invention permits a simple means of bringing about sealed internal insulation of a housing (12) accompanied by simultaneously improved manufacturability.

18 Claims, 1 Drawing Sheet ic material, it is possible, in particular, to prevent electrochemical effects of the electrolyte on the housing, such as for instance the formation of an electrochemical potential between the housing and the electrolyte, and the therefrom resulting corrosive, electrolytic attack on the housing material. Furthermore, in this way in particular it is possible to prevent an undesired voltage being present on the housing, which could constitute a hazard. In particular, insulation of the housing with respect to further housings for further energy stores can in this way be considerably simplified.

ELECTROCHEMICAL ENERGY STORE

BACKGROUND OF THE INVENTION

The present invention relates to an electrochemical energy store and to a method for manufacturing same. The present invention relates, in particular, to an electrochemical energy store such as, for example, a lithium-ion battery having improved insulation of the cell housing.

Electrochemical energy stores such as, for example, lithium-ion batteries are widespread in many daily applications. They are used, for example, in computers such as, for example, laptops, mobile phones, music playback devices, smart phones and in other applications such as, for example, in wind power plants. Batteries of this type also provide advantages for the electrification of vehicles, such as for instance motor vehicles, for example HEV, PHEV, EV, micro-hybrids, in which many advances are being made at the moment.

Document US 2003/0228515 A1 discloses an electrochemical element which comprises a stack made of two or more cells which are arranged in a housing made of sheet metal. The inside of the sheet metal is coated with an insulating material.

Document KR 2012-0060315 also discloses a secondary battery. Such a battery comprises a battery housing having a resin layer and a metal layer.

Document KR 2009-0010410 also discloses a housing for a secondary battery, wherein a polymer film is arranged between the inside of the housing and the outside of an electrode arrangement.

SUMMARY OF THE INVENTION

The subject matter of the present invention is an electrochemical energy store, comprising a housing for accommodating at least one cell unit, wherein the housing forms a receptacle space for the arrangement of the cell unit, wherein a surface of the housing facing the receptacle space is at least partially covered by an electrically insulating material, wherein the housing also comprises an opening for filling a fluid electrolyte into the receptacle space, and wherein the opening is covered by two overlapping end regions of the electrically insulating material.

The electrochemical energy store described above permits, in a simple and cost-effective way, in particular, sealed, all-round internal insulation of a battery housing.

An electrochemical energy store can be understood here as, in particular, being a battery or battery cell, such as for example a primary battery or else a secondary battery, that is to say a rechargeable accumulator. A lithium-ion accumulator, or a lithium-ion battery, can be specified as a non-restrictive example of an accumulator.

The electrochemical energy store comprises here a housing, in particular a cell housing, for accommodating at least one cell unit in a receptacle space, formed by the housing, for the at least one cell unit. In this context, it is possible to provide just one cell unit or a multiplicity of cell units can be provided without parting from the scope of the invention. The one or the multiplicity of electrochemical cell units can be embodied here essentially as is known from the prior art, and comprise an anode, a cathode, a separator and an electrolyte. For the exemplary case of a lithium-ion battery, the anode can, for example, comprise or be embodied from metallic lithium or from a material in which lithium ions can be embedded or interpolated and from which they can be released or deinterpolated again. For example, such an anode material can be applied, for example knife coated, onto a current collector. Exemplary anode materials comprise graphite or lithium titanate. The cathode can correspondingly also comprise, for the purely exemplary case of a lithium-ion battery, for example nickel-manganese cobalt oxide (NMC) or lithium cobalt oxide (LiCoO$_2$) or be embodied therefrom and also applied to a current collector. In this case, the cathode material, and also the anode material, can, if appropriate, be present in a binding agent such as, for example, polyvinylidenefluoride (PVDF), for example together with a conductive additive such as, for example, an electrically conductive carbon compound, for example graphite.

The electrolyte can also be, in a manner known per se, for example a solid electrolyte or comprise a solvent in which one or more electrically conductive salts are dissolved. For example, aprotic solvents such as for example ethylene carbonate, propylene carbonate, dimethyl carbonate or diethyl carbonate can be used. Furthermore, lithium hexafluorophosphate (LiPF$_6$) can be used as the electrically conductive salt. For example, the electrolyte can be located in pores of the separator. The separator may be, for example, an in particular porous plastic film, formed, for example, from polypropylene.

The housing serves, for example, to protect the cell unit described above for instance from external influences. The housing can comprise, for example, a trough-like base body and at the same time have, for example, a base and one or more corresponding wall regions. The base body can comprise here an opening which can be closed off by a cover element. The housing, or in particular the base body, has here a receptacle space which is embodied to accommodate a cell unit or the multiplicity of cell units, or for the latter to be arranged therein.

The housing often has, in particular if it is embodied from an electrically conductive material, the same electrochemical potential as one of the two electrodes, since there is often an electrically conductive connection between these components. In particular, if a plurality of such energy stores are assembled into modules, the housings must be insulated in a potential-free fashion, or with respect to one another, since otherwise undesired currents can flow between the cells, which can constitute a hazard and can disrupt the operation of the energy store.

In order to prevent this, the surface of the housing facing the receptacle space is at least partially, preferably completely, covered by an electrically insulating material. An electrically insulating material can be here, in particular, such a material which prevents the formation of a disruptive electrical potential of the housing through contact of the housing with, for example, an electrode, or which prevents propagation of the electrical field from an electrode onto the housing. Purely by way of example, and not at all in a restrictive fashion, the electrically insulating material can have a specific electrical resistance of greater than or equal to $10^5$ $\Omega$m, a relative permittivity of $\varepsilon_r$>2 and/or a breakdown voltage of >10 kV/mm. At least partial coverage can mean here, in particular, that coverage occurs at least in such a way that a negative electrochemical effect on the housing by the electrolyte can be prevented during normal operation. Advantageously, the surface of the housing facing the receptacle space can be covered completely by an electrically insulating material, in order to prevent a negative effect described above in a particularly safe way.

In this context, by virtue of the fact that the surface of the housing facing the receptacle space is covered at least partially, in particular completely, by an electrically insulating material, that is to say the receptacle space is separated from the housing by the electrically insulating material, it is also possible to have recourse to a liquid electrolyte, which can entail advantages for the operation and the manufacture of the energy store. In particular when a liquid electrolyte is used, an all-round, enclosed and therefore sealed insulation can be advantageous, with the result that an electrical effect on the housing by an electrode element via an electrolyte bridge is prevented. The insulating material is advantageously selected here in such a way that it is chemically resistant to the electrolyte, and is therefore not adversely affected by the electrolyte.

Internal insulation of the housing as described above has significant advantages over external insulation here.

External insulation is demanding, in particular because it should be resistant to possibly occurring chemicals and in addition, in particular to mechanical stresses. External insulation which is often used, such as for example surface coatings or shrink-fit hoses, therefore has to satisfy stringent requirements in terms of their stability. In particular, in contrast to insulation which is present on the outside of a housing, a hazard posed by mechanical stresses can be virtually completely prevented here in the case of internal insulation, that is to say in the case of insulation which is present on the side of the housing facing the cell unit.

Furthermore, it becomes possible, in particular in the case of a housing which is referred to as a hard case, to combine the particularly good and stable properties thereof with the advantages of internal insulation.

Compared to a surface coating, which can often be used as an external surface coating, with internal insulation there is no need, for example, for an additional process step or, in particular, a drying time. As a result, production costs can be lowered. Due to the absence of mechanical stresses on the insulation, it is additionally possible to embody the latter in a mechanically less stable and therefore somewhat thinner fashion, which in turn can reduce costs and can increase the energy density of a battery module.

As explained above, a liquid electrolyte is often used in an energy store as described above. In order to fill said electrolyte into the housing, the housing comprises an opening for filling the electrolyte into the receptacle space. This opening can be used, for example, to feed the liquid electrolyte into the housing, for example with a cannula. In order to embody the electrical insulation in a particularly safe and sealed fashion even in the region of the filling-in opening for the electrolyte, the opening is covered by two overlapping end regions of the electrically insulating material.

An embodiment of the opening as being covered by two overlapping end regions of the electrically insulating material can mean here, in particular, that the opening is covered by two layers of the insulating material lying one on top of the other. In this context, an end region of each of the two layers of the electrically insulating material is located in the region of the opening in such a way that the layers can be pressed apart from one another, for example by a cannula, with the result that the cannula can be guided along the ends of the layers into the inner region of the housing without damaging the electrically insulating material.

Such an embodiment makes it particularly easily possible for safe electrical insulation to be present even in the region of the filling-in opening for the electrolyte. This is because such an embodiment of the electrical insulating material permits a filling-in cannula for the liquid electrolyte to be guided into the receptacle space, or into the interior of the housing, without damaging the electrical insulation, for example as a result of penetration of the electrically insulating material. It is therefore possible for the electrical insulation to be unchanged compared to a state present before the filling, even after the cannula is led out of the opening. As a result, it can particularly be ensured that contact of the liquid electrolyte with the housing can be prevented. In this way, the energy store can operate particularly safely even in a module.

Furthermore, such an embodiment of a safe sealed insulation in the interior of the housing can also be obtained in a particularly cost-effective way, with the result that the energy store described above can also be manufactured in a particularly cost-effective way.

In summary, an energy store described above therefore permits a simple means of bringing about sealed internal insulation of a housing accompanied by simultaneously improved manufacturability.

Within the scope of an embodiment, the electrically insulating material can have a melting temperature or a glass transition temperature which is above the operating temperature of the cell unit and below the melting temperature or the glass transition temperature of the material of the housing, in particular with respect to the region of the housing which is in contact with the insulating material, for example the cover or the entire housing. In particular in this embodiment, a particularly sealed and safe insulation can be possible in the interior of the housing. This is because in this embodiment it is possible to heat the electrically insulating material, such as in particular a plastic, in such a way that the latter melts and therefore the two end regions lying one on top of the other become connected to one another after the housing is filled with liquid electrolyte. As a result of the fact that the melting temperature or the glass transition temperature of the electrically insulating material is above the operating temperature of the cell unit, the electrically insulating material remains stable even during operation of the energy store. Furthermore, as a result of the fact that the melting temperature or the glass transition temperature of the electrically insulating material is below the melting temperature of the material of the housing, the housing is not adversely affected when the two ends of the electrically insulating material are connected.

In particular in the case of the abovementioned embodiment, the electrically insulating material can be selected from the group comprising polyethylene (PE), polypropylene (PP), polyimide (PI), polyethyleneterephthalate (PET) or polyetherketone (PEK) such as, for example, polyaryletherketone (PAEK), for example polyetheretherketone (PEEK). In particular, these materials have an melting point which is above the operating temperature of a conventional cell unit. Furthermore, the melting point of these materials is sufficiently low, with the result that a multiplicity of suitable housing materials are not damaged but instead continue to be stable at the melting temperature or the glass transition temperature of the electrically insulating material.

Furthermore, the abovementioned materials are inert compared to a large number of liquid electrolytes, with the result that they do not adversely affect the operation of the energy store. However, the electrically insulating material is basically freely selectable as a function of the selected cell unit, the selected electrolyte system and, if appropriate, the material of the housing.

For example, the housing can be a metallic housing. The housing can particularly advantageously be an inflexible housing which is also referred to as a hard case housing. In particular in this embodiment, the positive properties of the stability of a hard case housing can be combined with the preferred insulation in the interior of the housing. In a non-restrictive fashion, the housing can be embodied from aluminum, for example from deep-drawn aluminum sheet.

With respect to further technical features and advantages of the energy store according to the invention, reference is explicitly made herewith to the explanations relating to the inventive energy storage module, the method, the figures and the description of the figures.

The subject matter of the present invention is also an energy storage module having a multiplicity of energy stores, wherein the energy storage module comprises at least one energy store, preferably a multiplicity of energy stores, as are described above in detail. Such an energy storage module or battery module has, in particular, the advantage of a simple and cost-effective means of bringing about sealed internal insulation of at least one housing such as, for example, a cell housing along with simultaneous simple manufacturability. As a result, the module can operate in a particularly safe and stable fashion over the long term. It can be preferred here that just one energy store, a suitable multiplicity thereof or all of the energy stores present in the module are embodied as described above.

With respect to further technical features and advantages of the energy storage module according to the invention, reference is explicitly made herewith to the explanations relating to the inventive energy store, the method, the figures and the description of the figures.

The subject matter of the present invention is also a method for manufacturing an energy store, in particular battery cell, comprising the method steps:

a) making available a housing for an energy store, in particular a cell housing, for accommodating a cell unit, wherein the housing comprises a receptacle space for the arrangement of the cell unit, wherein a surface of the housing facing the receptacle space is at least partially, in particular completely, covered by an electrically insulating material, wherein the housing also has an opening for filling a liquid electrolyte into the receptacle space and wherein the opening is covered by two overlapping end regions of the electrically insulating material;

b) insertion of a cannula through the opening while pressing apart the end regions in such a way that an outlet opening of the cannula is exposed in the receptacle space;

c) filling the liquid electrolyte into the receptacle space; and d) removing the cannula from the opening.

The method described above permits a particularly safe and sealed electrical insulation of the inside of the housing in a simple and cost-effective fashion.

For this purpose, the method comprises according to method step a) making available a housing for an energy store, in particular a cell housing, for accommodating a cell unit. The housing which is, for example, a metallic housing, therefore comprises a receptacle space for the arrangement of the cell unit. In order to permit internal insulation of the housing, which insulation can prevent contact of the liquid electrolyte with the housing, the surface of the housing facing the receptacle space is covered at least partially, preferably completely, by an electrically insulating material. In detail, the electrical insulation or the electrically insulating material is present in such a way that an opening for filling a liquid electrolyte into the receptacle space is covered by two overlapping end regions of the electrically insulating material, for example by two ends of a plastic film. With respect to the precise embodiment of the housing, of the electrically insulating material and of the cell unit, reference is made to the above description of the energy store.

Furthermore, the method comprises according to method step b) the insertion of a cannula through the opening while pressing apart the end regions in such a way that an outlet opening of the cannula is exposed in the receptacle space. In this method step, a cannula is therefore guided through the opening with the result that the end of the cannula at which an electrolyte can flow out of the cannula is exposed in the receptacle space for the cell unit. Exposed can mean here, in particular, that the corresponding end of the cannula is not covered by an insulating material and, in addition, under certain circumstances does not yet bear against the cell unit. In this method step, the cannula is therefore positioned in such a way that an electrolyte can be filled into the receptacle space through the cannula. Furthermore, when the cannula is inserted into the opening the end regions are pressed apart. This has the advantage that it is safely possible to prevent the electrically insulating material from being damaged. For this purpose, the cannula which is used can advantageously be blunt in the region of the outlet opening, in order to permit damage-free pressing apart of the end regions in a particularly advantageous way. A cannula can be understood here to be, in particular, a means for filling in a liquid electrolyte which has an at least partially tubular guide for the electrolyte and has a length permitting it to pass through the opening and into the receptacle space.

Such filling of the electrolyte into the housing occurs according to method step c). In this context, in particular a liquid electrolyte which is explained above in detail is fed into the receptacle space of the cell unit.

According to method step d), the cannula is subsequently removed from the opening. This step takes place, in particular, when sufficient electrolyte is present in the housing or the latter is completely filled with electrolyte.

The method described above is characterized, in particular, by its simplicity and cost-effectiveness and also permits the manufacture of an energy store with a low level of risk of damage when the electrolyte is filled in, and therefore with a high level of operational safety.

Within the scope of one embodiment, the method can have the further step:

e) closing off the opening using heat in such a way that the overlapping end regions of the electrically insulating material are materially joined to one another.

This method step serves, in particular, to close off or seal the electrically insulating material completely after a removal of the cannula, with the result that the liquid electrolyte cannot enter into contact with the possibly electrically conductive housing. This is because in this embodiment it is possible that the insulating material, such as in particular a plastic, is heated above its melting temperature or glass transition temperature in such a way that the adjacent end regions of the electrically insulating material melt and are therefore closed off. This step can be improved in particular by good thermal conductivity of the housing material, for example of a metal.

Furthermore, this method step can serve to connect the electrically insulating material, for example a plastic insulation, to the, in particular, metallic housing. As a result, slipping of the electrically insulating material can be prevented since it is securely fixed to the housing. In this context, the thermal effect cannot only be limited to the closing off of the opening and therefore to the region about the opening but it is also possible to close off further sites. For example, thermal treatment at joints, such as for example a cover weld seam which runs around, can be implemented, at which joints the electrical insulation is molten, or also essentially on the entire housing.

In this embodiment, a sealed, all-round electrical insulation of the housing is therefore permitted even at existing filling-in positions after the electrolyte has been filled in.

In particular, method step e) can be carried out using a laser. In this context, a thermal effect which has high precision both spatially and with respect to the temperature can be made possible, in particular by using a laser.

Furthermore, method step e) can be carried out within the scope of a welding process for closing off the opening, for example by means of the laser. In this context, a welding process can particularly advantageously close off the opening in a fashion which is safe and stable over the long term, wherein owing to the thermal treatment of a welding process particularly advantageous synergistic effects occur. This is because the temperature effect which is necessary for a welding process can be used in a step in order to melt or soften the electrically insulating layer which is present, in particular, on the housing, and to materially join the ends to one another in the way as is described above in detail.

Within the scope of a further embodiment, the opening can be closed off by a closure means. In particular in this embodiment, a closure means, such as for example a screw, a rivet, a ball or a stopper, can be introduced into the opening. As a result, the opening can already be safely closed off. In this context, the abovementioned closure means are embodied, in particular, from the same material as the housing. In particular in this embodiment, the opening can be closed off by a welding process in that the closure means are welded to the housing surrounding the opening.

With respect to further technical features and advantages of the method according to the invention, reference is explicitly made herewith to the explanations relating to the inventive energy store, the energy storage module, the figures and the description of the figures.

BRIEF DESCRIPTION OF THE DRAWINGS

Further advantages and advantageous embodiments of the subject matters according to the invention are illustrated by the drawings and explained in the following description. It is to be noted here that the drawings have only a descriptive character and are not intended to restrict the invention in any form. In the drawings.

DETAILED DESCRIPTION

Figure 1:
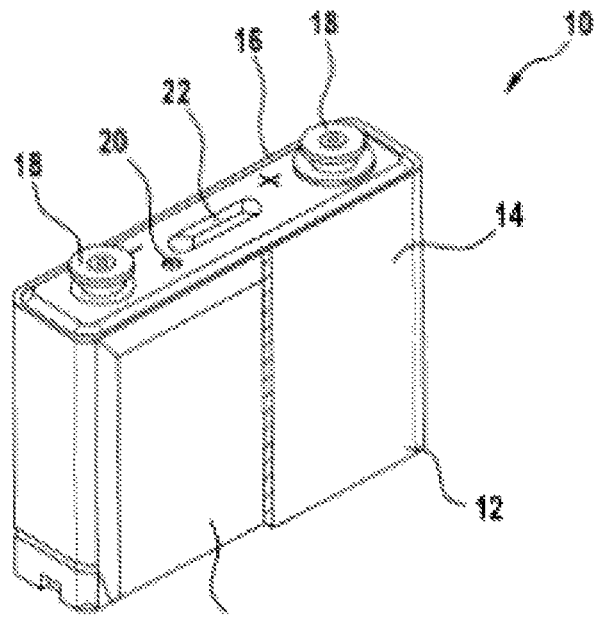
FIG. 1 shows a schematic, partially sectioned illustration of an embodiment of an electrochemical energy store.

FIG. 1 is a schematic illustration of an electrochemical energy store 10, such as in particular a battery cell. The energy store 10 can be, for example, a lithium-ion battery or lithium-ion cell, and be arranged, for example, in an at least partially electrically driven vehicle. In addition, the energy store 10 can be part of an energy storage module.

The energy store 10 comprises a housing 12 with a trough-like housing base body 14 and a cover element 16. In addition, connections or contacts 18 are provided which serve to tap electrical energy. Furthermore, an opening 20, which can be closed off and has the purpose of filling a fluid electrolyte, and an overpressure valve with a bursting disk 22 are shown in the cover element 16.

A cell unit 24 is also arranged in the housing 12, which is embodied, in particular, as an inflexible, so-called hard case housing. The cell unit 24 is embodied here as a winding element. According to FIG. 1, an arrangement of electrodes which is also referred to as a jelly roll is therefore present, said electrodes being provided in a wound, for example rolled or folded, configuration, and wherein a separator layer is provided between the electrodes. The cell unit 24 therefore has at least one positive electrode or cathode, a negative electrode or anode, and a separator which is located between them.

Such an embodiment can be implemented, for example, by the application on both sides of a corresponding electrode layer, described above, to a metal collector. The metal collector can be formed here from aluminum or from copper depending on the polarity of the electrode, and serves to connect the corresponding electrodes to the contacts 18.

Figure 2:
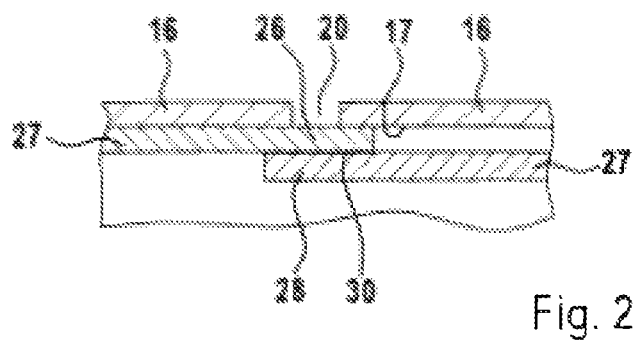
FIG. 2 shows a region of the energy store from FIG. 1.

FIG. 2 shows a region of the energy store 10 from FIG. 1. FIG. 2 shows the cover element 16 with the opening 20 in a sectional view. It is also apparent here that a surface 17 of the housing 12 facing a receptacle space for accommodating the cell unit 24 is covered completely by an electrically insulating material 27. It can be seen in detail that the opening 20 is covered by two overlapping end regions 26, 28 of the electrically insulating material 27. The end regions can be materially joined to one another here, in particular by a thermal effect, which is illustrated by the connecting region 30.

What is claimed is:

1. An electrochemical energy store, comprising a housing (12) for accommodating at least one cell unit (24), wherein the housing (12) forms a receptacle space configured to receive the cell unit (24), wherein an interior surface (17) of the housing (12) facing the receptacle space is at least partially covered by an electrically insulating material (27), wherein the housing (12) also comprises an opening (20) for filling a fluid electrolyte into the receptacle space, wherein the electrically insulating material (27) includes a first portion having a first end region (26) and a second portion having a second end region (28), wherein the first portion and the second portion extend in opposite lateral directions relative to one another such that the first end region (26) and the second end region (28) overlap with each other at the opening (20) and cover the opening (20), and wherein the first end region (26) lies over the second end region (28) such that, during filling of fluid electrolyte into the receptacle space, the overlapping first and second end regions (26) can be pressed apart by a cannula with the result that the cannula can be guided along ends of the overlapping first and second end regions (26) into the receptacle space, and wherein the cannula fills the fluid electrolyte into the receptacle space through the opening (20).

2. The energy store according to claim 1, wherein the electrically insulating material (27) has a melting temperature or a glass transition temperature which is above an operating temperature of the cell unit (24) and below a melting temperature or a glass transition temperature of the material of the housing (12).

3. The energy store according to claim 1, wherein the electrically insulating material (27) is selected from the group comprising polyethylene, polypropylene, polyimide, polyethyleneterephthalate or polyetherketone.

4. The energy store according to claim 1, wherein the housing (12) is a metallic housing.

5. An energy storage module having a multiplicity of energy stores (10), wherein the energy storage module comprises at least one energy store (10) according to claim 1.

6. The energy store according to claim 1, wherein the electrically insulating material (27) is polyaryletherketone.

7. The energy store according to claim 1, wherein the electrically insulating material (27) is polyetheretherketone.

8. The energy store according to claim 1, wherein the electrically insulating material (27) is polyethylene.

9. The energy store according to claim 1, wherein the electrically insulating material (27) is polypropylene.

10. The energy store according to claim 1, wherein the electrically insulating material (27) is polyimide.

11. The energy store according to claim 1, wherein the electrically insulating material (27) is polyethylene-terephthalate.

12. The energy store according to claim 1, wherein the electrically insulating material (27) is polyetherketone.

13. The energy store according to claim 1, wherein the interior surface (17) is covered completely by the electrically insulating material (27) such that the housing (12) is electrically insulated from the receptacle space.

14. A method for manufacturing an energy store (10), comprising the method steps:
   a) providing a housing (12) for an energy store (10), for accommodating at least one cell unit (24), wherein the housing (12) forms a receptacle space configured to receive the cell unit (24), wherein an interior surface (17) of the housing (12) facing the receptacle space is at least partially covered by an electrically insulating material (27), wherein the housing (12) also comprises an opening (20) for filling a fluid electrolyte into the receptacle space, wherein the electrically insulating material (27) includes a first portion having a first end region (26) and a second portion having a second end region (28), wherein the first portion and the second portion extend in opposite lateral directions relative to one another such that the first end region (26) and the second end region (28) overlap with each other at the opening (20) and cover the opening (20), and wherein the first end region (26) lies over the second end region (28) such that, during filling of fluid electrolyte into the receptacle space, the overlapping first and second end regions (26) can be pressed apart by a cannula with the result that the cannula can be guided along ends of the overlapping first and second end regions (26) into the receptacle space;
   b) insertion of a cannula through the opening (20) while pressing apart the overlapping first and second end regions (26, 28) in such a way that an outlet opening of the cannula is exposed in the receptacle space, wherein the cannula is guided along ends of the overlapping first and second end regions (26) into the receptacle space;
   c) filling a liquid electrolyte into the receptacle space through the opening (20) using the cannula; and
   d) removing the cannula from the opening (20).

15. The method according to claim 14, wherein the method comprises the further step:
   e) closing off the opening (20) using heat in such a way that the overlapping first and second end regions (26, 28) of the electrically insulating material (27) are materially joined to one another.

16. The method according to claim 15, wherein method step e) is carried out using a laser.

17. The method according to claim 15, wherein method step e) is carried out within the scope of a welding process for closing off the opening (20).

18. The method according to claim 14, wherein the opening (20) is closed off by a closure means.

* * * * *